(12) United States Patent
Watt et al.

(10) Patent No.: US 9,135,739 B2
(45) Date of Patent: Sep. 15, 2015

(54) OPTIMIZING GRAPH EVALUATION

(75) Inventors: Martin Watt, Glendale, CA (US);
Alexander P. Powell, Glendale, CA (US)

(73) Assignee: DreamWorks Animation LLC,
Glendale, CA (US)

( * ) Notice: Subject to any disclaimer, the term of this patent is extended or adjusted under 35 U.S.C. 154(b) by 167 days.

(21) Appl. No.: 13/605,966

(22) Filed: Sep. 6, 2012

(65) Prior Publication Data
US 2013/0194279 A1 Aug. 1, 2013

Related U.S. Application Data (60) Provisional application No. 61/531,606, filed on Sep. 6, 2011, provisional application No. 61/679,667, filed on Aug. 3, 2012.

(51) Int. Cl.
*G06T 13/00* (2011.01)
*G06T 13/40* (2011.01)
*G06T 17/00* (2006.01)

(52) U.S. Cl.
CPC .............. *G06T 13/40* (2013.01); *G06T 17/005* (2013.01)

(58) Field of Classification Search
None
See application file for complete search history.

(56) References Cited

U.S. PATENT DOCUMENTS

| 5,929,864 A | 7/1999 | Picott et al. |
| 6,525,737 B1 | 2/2003 | Duluk, Jr. et al. |

(Continued)

FOREIGN PATENT DOCUMENTS

| CN | 101916324 A | 12/2010 |
| WO | 2005/114586 A1 | 12/2005 |

(Continued)

OTHER PUBLICATIONS

International Search Report and Written Opinion received for PCT Patent Application No. PCT/US2012/054031, mailed on Nov. 8, 2012, 9 pages.

(Continued)

*Primary Examiner* — Phi Hoang
*Assistant Examiner* — Mohammad H Akhavannik
(74) *Attorney, Agent, or Firm* — Morrison & Foerster LLP (57) ABSTRACT

A system for performing graphics processing is disclosed. A dependency graph comprising interconnected nodes is accessed. Each node has output attributes and the dependency graph receives input attributes. A first list is accessed, which includes a dirty status for each dirty output attribute of the dependency graph. A second list is accessed, which associates one of the input attributes with output attributes that are affected by the one input attribute. A third list is accessed, which associates one of the output attributes with output attributes that affect the one output attribute. An evaluation request for a requested output attribute is received. A set of output attributes are selected for evaluation based on being specified in the first list as dirty and being specified in the third list as associated with the requested output attribute. The set of output attributes are evaluated.

24 Claims, 9 Drawing Sheets

(56) References Cited

U.S. PATENT DOCUMENTS

| | | |
|---|---|---|
| 6,538,651 B1 | 3/2003 | Hayman et al. |
| 7,064,761 B2 | 6/2006 | Grassia et al. |
| 7,330,185 B2 | 2/2008 | Grassia et al. |
| 7,532,212 B2 | 5/2009 | Grassia et al. |
| 8,169,436 B2 | 5/2012 | Rivera et al. |
| 2003/0067468 A1 | 4/2003 | Duluk, Jr. et al. |
| 2005/0248573 A1 | 11/2005 | Grassia et al. |
| 2006/0274070 A1 | 12/2006 | Herman et al. |
| 2010/0123723 A1 | 5/2010 | Collard et al. |
| 2010/0281071 A1 | 11/2010 | Ben-Zvi et al. |

FOREIGN PATENT DOCUMENTS

| | | |
|---|---|---|
| WO | 2005/114589 A1 | 12/2005 |
| WO | WO 2009/094673 A2 | 7/2009 |

OTHER PUBLICATIONS

Office Action received for Chinese patent Application No. 201280050157.4, mailed on Jun. 3, 2015. 8 pages (English translation, 7 pages).

| NODE.OUTPUT_ATTRIBUTE | DIRTY |
|---|---|
| node_A.output_1 | 0 |
| node_A.output_2 | 1 |
| node_B.output_1 | 1 |
| node_C.output_1 | 0 |
| node_C.output_2 | 0 |
| node_D.output_1 | 1 |
| node_D.output_2 | 1 |
| node_D.output_3 | 0 |
| node_E.output_1 | 1 |

Fig. 4

| DIRTY NODE.OUTPUT_ATTRIBUTE |
|---|
| node_A.output_2 |
| node_B.output_1 |
| node_D.output_1 |
| node_D.output_2 |
| node_E.output_1 |

| NODE.OUTPUT_ATTRIBUTE | AFFECTING NODE.OUTPUT_ATTRIBUTES |
|---|---|
| node_D.output_2 | node_A.output_1 |
| | node_A.output_2 |
| | node_B.output_1 |
| | node_C.output_1 |

Fig. 9

| NODE.OUTPUT_ATTRIBUTE | AFFECTING NODE.OUTPUT_ATTRIBUTES |
|---|---|
| node_D.output_2 | node_A.output_1 |
| | node_A.output_2 |
| | node_B.output_1 |
| | node_C.output_1 |
| node_D.output_1 | node_A.output_1 |
| | node_A.output_2 |
| | node_B.output_1 |

OPTIMIZING GRAPH EVALUATION

CROSS-REFERENCE TO RELATED APPLICATIONS

This application claims priority to U.S. Provisional Application No. 61/531,606 filed with the U.S. Patent and Trademark Office on Sep. 6, 2011, the entire contents of which are hereby incorporated by reference, and to U.S. Provisional Application No. 61/679,667 filed with the U.S. Patent and Trademark Office on Aug. 3, 2012, the entire contents of which are hereby incorporated by reference.

BACKGROUND

1. Field

The present disclosure relates to computer-generated animation and, more specifically, to optimizing the evaluation of a dependency graph for computer-generated animation.

2. Related Art

Media productions typically use dependency graphs to render, animate, or otherwise describe a scene in an animation. The dependency graphs can include a system of interconnected nodes that perform computations on input data, such as input attributes, and produce output data, such as output attributes. A node may have multiple input attributes and multiple output attributes, as well as other attributes.

As media productions create more realistic animations, the complexity and the number of nodes in the dependency graphs used to support these animations also increase. As a result, the time and computational resources required to evaluate these dependency graphs also typically increase. Accordingly, there is a need to optimize the evaluation of dependency graphs.

SUMMARY

Systems and processes for performing graphics processing are described. A dependency graph may be accessed. The dependency graph may comprise a plurality of interconnected nodes, each node having one or more output attributes, wherein the dependency graph receives one or more input attributes. A first list may be accessed, wherein the first list includes a dirty status for each dirty output attribute of the dependency graph. A second list may be accessed, wherein the second list associates at least one of the one or more input attributes with output attributes that are affected by the at least one of the one or more input attributes. A third list is accessed, wherein the third list associates at least one of the output attributes with output attributes that affect the at least one of the output attributes. An evaluation request for a requested output attribute is received. A set of output attributes are selected for evaluation based on the set of output attributes being specified in the first list as dirty and the set of output attributes being specified in the third list as associated with the requested output attribute. The set of output attributes are evaluated.

The dependency graph may be walked to determine the association in the second list. Walking the graph dependency to determine the association in the second list may be in response to detecting a change in the value of the at least one of the one or more input attributes. The first list may be updated based on the second list in response to detecting a change in the value of the at least one of the one or more input attributes. In response to receiving the evaluation request, the third list may be updated to associate the requested output attribute with output attributes that affect the requested output attribute. The dependency graph may be walked to determine the association in the third list. The dirty status for the output attributes in the first list may be updated in response to the evaluation of the set of output attributes. The dependency graph may represent one or more three-dimensional objects.

BRIEF DESCRIPTION OF THE FIGURES

The present application can be best understood by reference to the following description taken in conjunction with the accompanying drawing figures, in which like parts may be referred to by like numerals.

FIG. 9 illustrates an exemplary output dependency list for an affected output attribute.

FIG. 10 illustrates an exemplary output dependency list for multiple affected output attributes.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

Figure 1A:
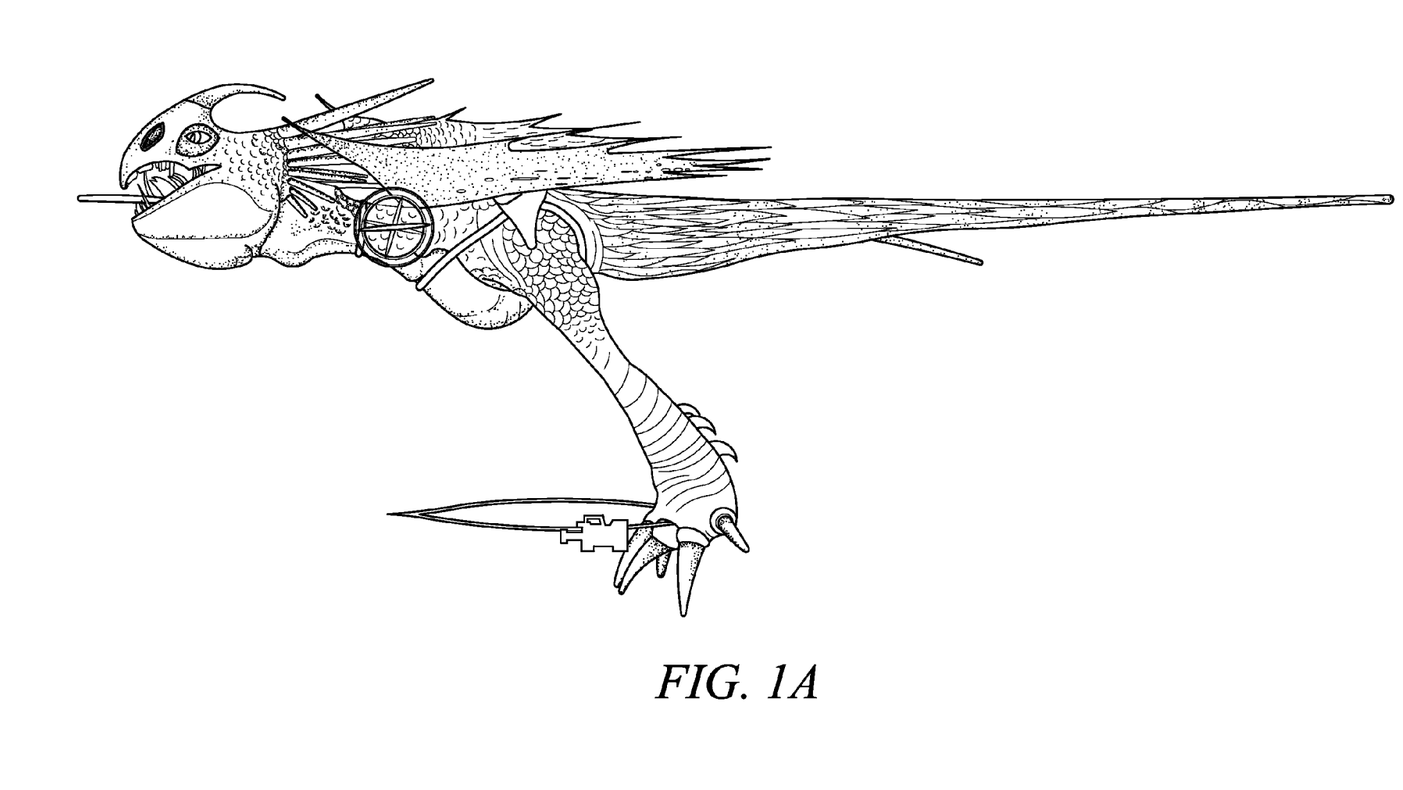
FIG. 1 illustrates a series of rendered images that result from changes in the value of a rotation input attribute of a transformation node.
Figure 1B:
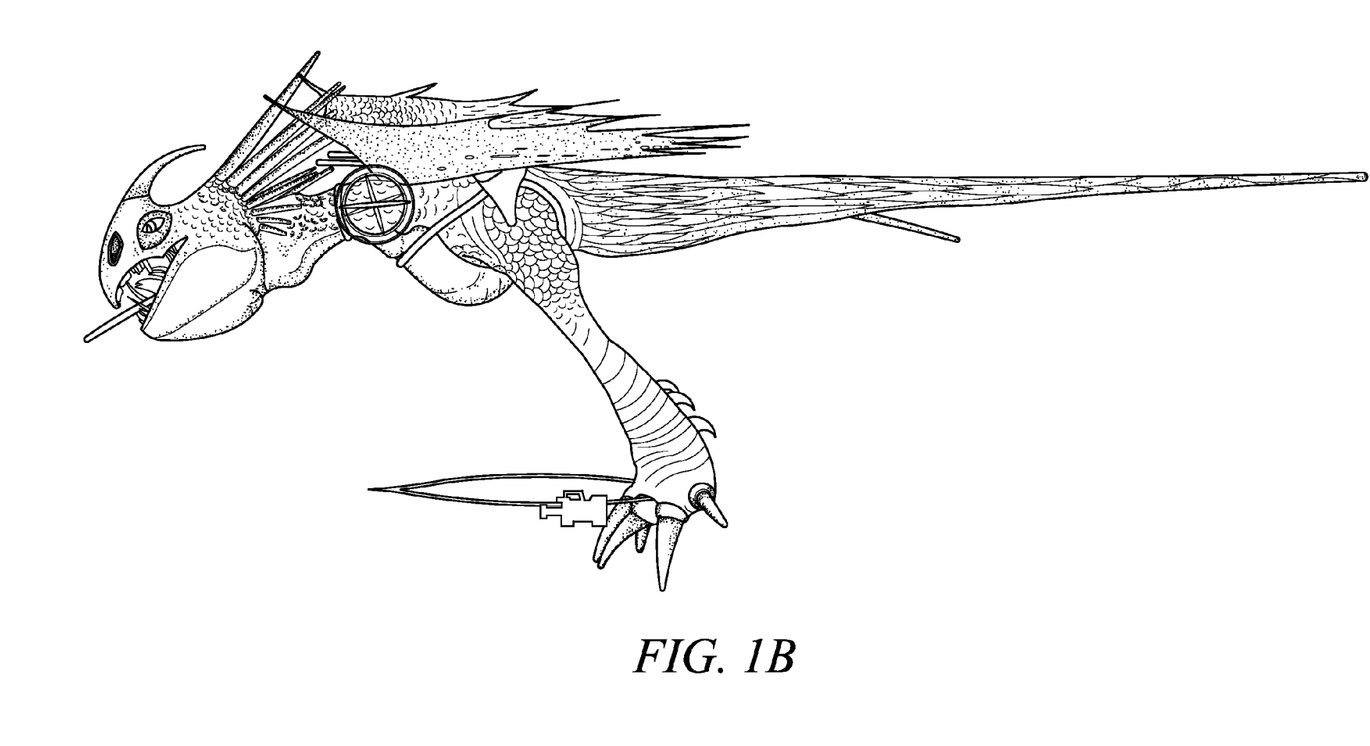
Figure 1C:
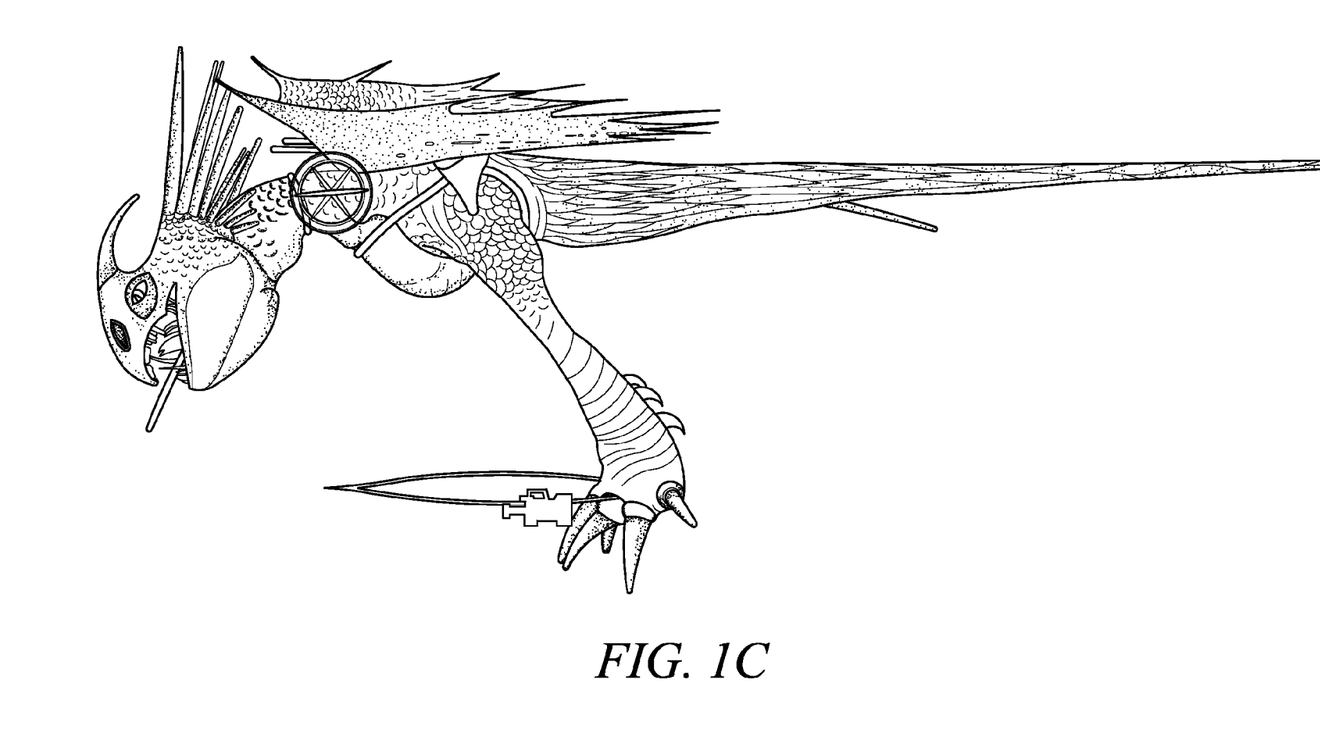

FIG. 1 illustrates exemplary images from an animation rendered using the process described in detail below. Each frame of the animation is rendered by evaluating a dependency graph that describes the character in the scene. For each frame, at least the value of the rotation input attribute of the transformation node of the character's neck has changed in the dependency graph, resulting in the movement of the character's neck. A transformation node may determine the scale, rotation, and location of an element, such as the character's neck, along the X, Y and Z axes.

Generally, attributes may refer to parameters of nodes that can be controlled through the system. Input attributes include attributes of a node that may be set by the system or that may be set by another node. In this example, the change in the value of the rotation input attribute of the transformation node of the character's neck results in a change to the value of the rotation_display output attribute of that transformation node. Output attributes include attributes of a node that may be read by the system or that may be accessed by another node. To determine the value of the rotation_display output attribute of the transformation node, the node may be evaluated. Evaluation may include, for example, computation, execution, or calculation. For example, the transformation node may determine the location of the character's neck using matrix multiplication. When the value of a specific output attribute of a node is requested, the system may evaluate the node to compute that specific output attribute. This may be referred to as evaluating the output attribute of the node. Alternatively, a node may be evaluated to compute all output attributes of the node.

The change in the value of the rotation_display output attribute of the transformation node of the character's neck may be propagated through the dependency graph when the dependency graph is evaluated. In this example, this may result in a change in the value of the character's output attributes, causing the appearance of the movement of the character's neck when the animation is rendered.

Referring to FIG. 1, because the input attributes of the transformation node of the character's legs have not changed throughout these frames, the position of the character's legs have also not changed throughout the frames of the animation. Thus, once the output attributes of the transformation node of the character's legs have been evaluated for the first frame, the values may be cached for use in the subsequent frames. The values of the input attributes of the transformation node of the character's legs do not change, and thus the value of the output attributes of the transformation node of the character's legs do not change. Accordingly, the transformation node of the character's legs may not need to be reevaluated for each frame after being evaluated for the first frame.

Figure 2:
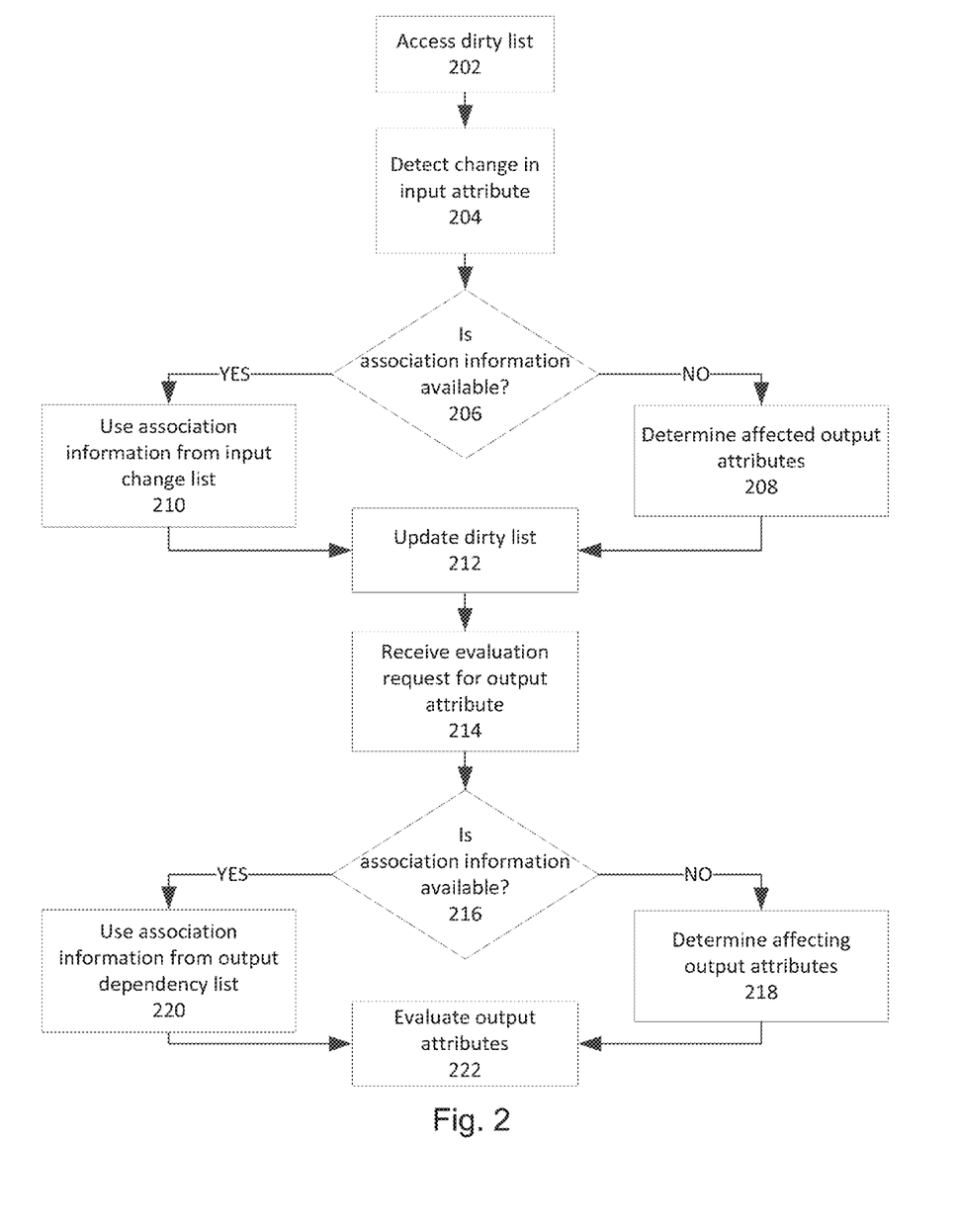
FIG. 2 illustrates an exemplary process for evaluating an output attribute of a dependency graph.

FIG. 2 illustrates an exemplary process for evaluating a dependency graph that is configured to cache output attributes. The evaluation may be initiated by various triggers. For example, a request to display an image, a playback of an animation, a request for a value of an output attribute of a node, or the like, may initiate an evaluation.

1. Tracking Dirty Output Attributes using a Dirty List

Referring to block 202 of FIG. 2, information in a dirty list specifying which cached output attributes are invalid and which cached output attributes are valid may be accessed. The dirty list may be generated by a system configured to store dirty information about the output attributes of a dependency graph in a dirty list. To track the validity of cached output attributes, the system may use the dirty list to identify an invalid output attribute as "dirty." For example, a cached output attribute may be invalid, and thus dirty, when a value of an input attribute that affects the value of the output attribute changes. Thus, an input attribute affects an output attribute when the valid value of the output attribute depends on the value of the input attribute. The dirty list may be configured in many ways.

In one example, the dirty list may be a list of only references to output attributes that are dirty. Thus, when an output attribute becomes dirty, it should be added to the list. When an output attribute is evaluated and is no longer dirty, it should be removed from the list. In another example, the dirty list may be a comprehensive list of all output attributes. Each output attribute identified in the comprehensive list may have a dirty flag or other dirty information associated with it to indicate whether the output attribute is dirty. In yet another example, the dirty list may contain a subset of the comprehensive list of output attributes. Each output attribute identified in the list may have a dirty flag or other dirty information associated with it to indicate whether the output attribute is dirty. In another example, the dirty list may be an array of "0"s and "1"s. A "0" at a particular location in the array may represent that an output attribute associated with that particular location is not dirty and a "1" at a particular location in the array may represent that an output attribute associated with that particular location is dirty. Such an array may be more conducive to bitwise operations, such as AND, OR, NOT, and XOR, than other types of lists.

Tracking the dirty status of output attributes in a dirty list may render tracking the dirty status of output attributes at the node level redundant. Instead, the dirty list may be stored external to the dependency graph.

Figure 3:
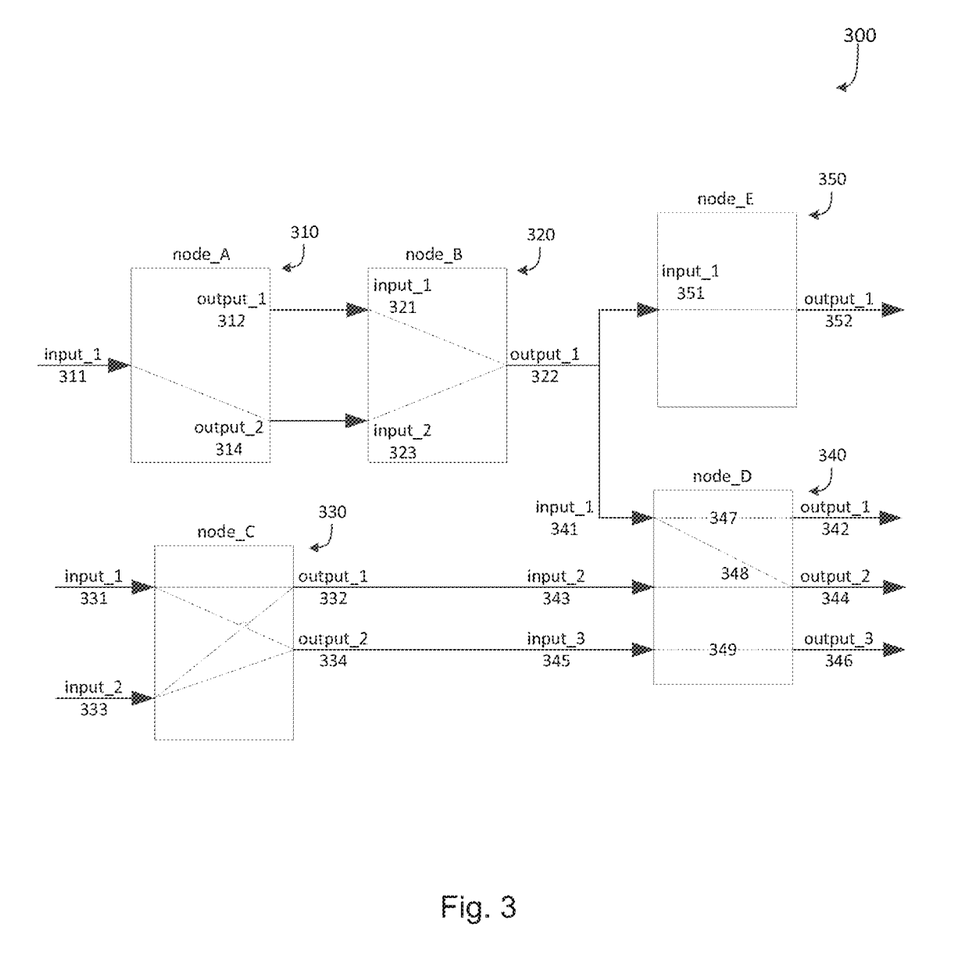
FIG. 3 illustrates an exemplary dependency graph.
Figure 4:
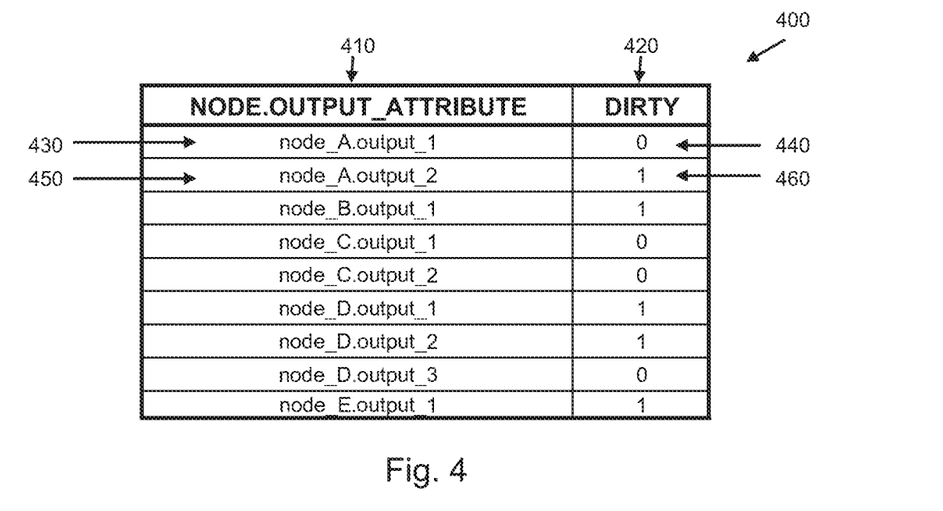
FIG. 4 illustrates an exemplary dirty list for tracking the dirty status of output attributes.

FIG. 3 and FIG. 4 illustrate one example of a dirty list 400. The dependency graph 300 of FIG. 3 includes five nodes: node_A 310, node_B 320, node_C 330, node_D 340, and node_E 350. Dotted lines within a node indicate that an output attribute of the node is based on a connected input attribute of the node. For example, node_D 340 has three input attributes: input_1 341, input_2 343, and input_3 345. Node_D 340 also has three output attributes: output_1 342, output_2 344, and output_3 346. The dotted line 347 indicates that input_1 341 of node_D 340 is used to compute output_1 342 of node_D 340. Similarly, dotted line 348 indicates that input_1 341 of node_D 340 and input_2 343 of node_D 340 are used to compute output_2 344 of node_D 340; dotted line 349 indicates that input_3 345 of node_D 340 is used to compute output_3 346 of node_D 340. These relationships do not necessarily need to be displayed in the dependency graph, but are helpful for illustrating the concepts discussed.

Referring to FIG. 4, the NODE.OUTPUT_ATTRIBUTE column 410 contains a comprehensive list of all output attributes of the dependency graph 300. Each output attribute of the dependency graph is associated with a dirty flag in the DIRTY column 420. In this example, a value of "0" for the dirty flag indicates the associated output attribute is not dirty. A value of "1" for the dirty flag indicates the associated output attribute is dirty. The naming scheme in this embodiment has been selected for illustrative purposes. The name node_A.output_1 430 indicates the output attribute named "output_1" of the node named "node_A." The "0" value 340 for the dirty flag associated with node_A.output_1 indicates that this output attribute is not dirty. Thus, the cached value at output_1 of node_A may be used without reevaluating node_A or reevaluating the output_1 output attribute of node_A. Similarly, node_A.output_2 450 is associated with a "1" value 460 for its dirty flag. This indicates that output attribute output_2 of node_A is dirty and may need to be reevaluated. The remaining elements of FIG. 4 follow a similar syntax. Because this list indicates the current state of all output attributes, it may also be referred to as a current state cache.

Figure 5:
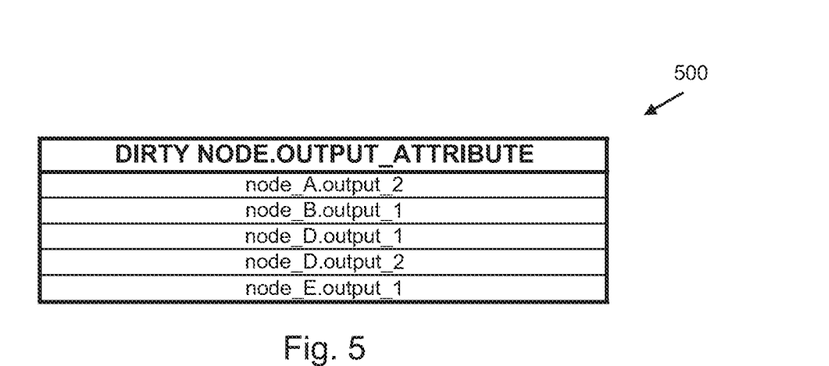
FIG. 5 illustrates another exemplary dirty list for tracking the dirty status of output attributes.

FIG. 3 and FIG. 5 illustrate another example of a dirty list 500. In this example, the dirty list 500 of FIG. 5 contains a list of all output attributes of dependency graph 300 that are dirty. Thus, when an output attribute is reevaluated and is no longer dirty, the reference to the output attribute should be removed from the dirty list 500. Similarly, when an output attribute is determined to be dirty, the output attribute should be added to the dirty list 500. Because this list indicates the current state of all output attributes, it may also be referred to as a current state cache.

2. The Input Change List

Referring to block 204 of FIG. 2, the system may detect a change in the value of an input attribute of the dependency graph. Frequently in animation, the same dependency graph must be repeatedly evaluated while the value of the same input attribute is changed for each evaluation. Each time an input attribute is changed, the system may need to determine which output attributes are affected, and thus should be marked as dirty. To reduce the computational resources required, the system may be configured to access an input change list to determine if the input change list contains information associating the changed input attribute with the output attributes that it affects. This input change list may be stored external to the dependency graph.

If the system determines in block 206 that the association information is available in the input change list, in block 210 the system may use the association information to quickly determine which output attributes should be marked as dirty in response to detecting the change in the value of the input attribute. However, if the system determines that the association information for the changed input attribute is not available in the input change list, in block 208 the system may walk the graph to determine which output attributes are affected by the changed input attribute.

Figure 6:
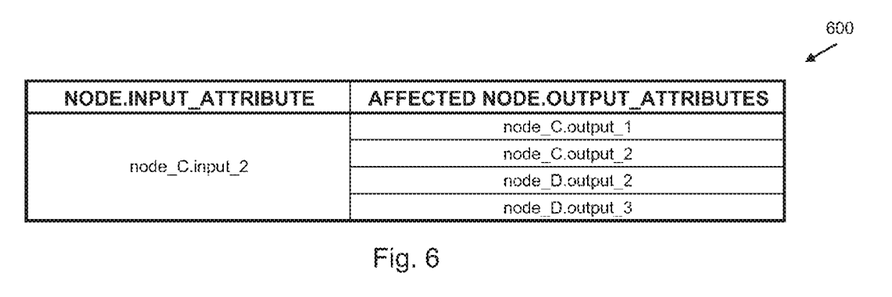
FIG. 6 illustrates an exemplary input change list for an input attribute.

The dependency graph 300 of FIG. 3 and the input change list 600 of FIG. 6 illustrate this concept. Consider the example when a user or the system modifies the value of input attribute node_A.input_1 311, as illustrated in dependency graph 300. When the system detects that node_A.input_1 311 has changed, the system may check the stored input change list 600 to determine if it includes information associating the changed input attribute node_A.input_1 311 with the output attributes that it affects. In this example, input change list 600 only indicates an association between node_C.input_2 and the outputs that it affects. Thus, the system will determine that the association information for the changed input attribute is not available in the input change list.

Referring to block 208, when the association information is not available for the changed input attribute, as is the case for the input change list 600 and changed input attribute node_A.input_1 311, the system may determine which output attributes are affected by the changed input attribute by "walking the dependency graph." Walking the dependency graph—walking the graph or traversing the dependency graph—is a process whereby the system follows the effects of an attribute, such as an input attribute, through the dependency graph to determine the attributes, such as the output attributes, that are affected by the input attribute. Thus, the system may walk or traverse the dependency graph starting at the location where an input attribute has changed to determine each output attribute that is affected by the changed input attribute. This may be called walking the graph downstream—or traversing the graph downstream—because it follows the flow of information.

Figure 7:
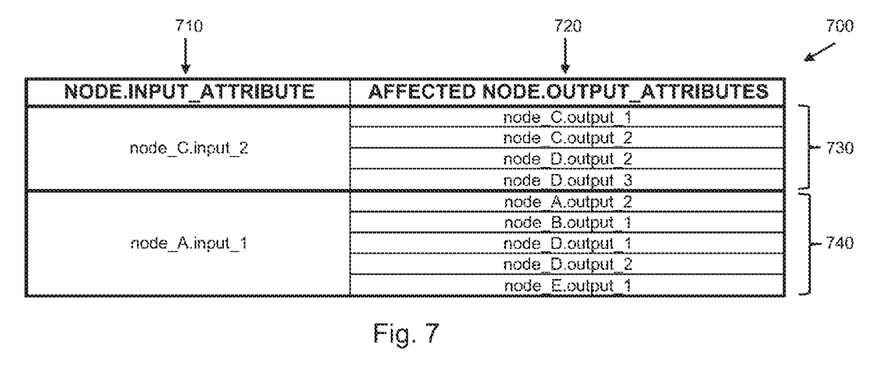
FIG. 7 illustrates an exemplary input change list for multiple input attributes.

Thus, when the system detects that node_A.input_1 311 has changed and determines that association information is not available in the input change list 600, the system may walk the graph to determine which outputs should be marked as dirty. The system may determine that node_A.output_1 312 is not affected by the change, but that node_A.output_2 314 should be identified as dirty. The system will continue to walk the graph and determine that the input attribute node_B.input_2 323 is connected to the dirty output attribute node_A.output_2 314. In turn, node_B.output_1 322 is affected by the change at node_B.input_2 323. Thus, output attribute node_B.output_1 322 should also be identified as dirty. The system next determines that input attributes node_D.input_1 341 and node_E.input_1 351 are connected to node_B.output_1 322. The system determines that output attribute node_D.output_1 342 and output attribute node_D.output_2 344 should be identified as dirty because they are computed based on node_D.input_1 341. The system also determines that output attribute node_E.output_1 352 should be identified as dirty because it is computed based on node_E.input_1 351. Thus, after walking the graph the system has selected the following output attributes to identify as dirty as a result of the changed input attribute node_A.input_1 311: node_A.output_2 314, node_B.output_1 322, node_D.output_1 342, node_D.output_2 344, and node_E.output_1 352. The system may then update the input change list 600 to add the new association. An exemplary updated input change list 700 is illustrated in FIG. 7. The system may also update the dirty list to identify these output attributes as dirty.

FIG. 7 depicts input change list 700 after it has been updated. The NODE.INPUT_ATTRIBUTE column 710 contains a list of all, or some, input attributes that have been changed and which have resulted in the system walking the dependency graph to determine the output attributes that are affected. For each input attribute listed in the NODE.INPUT_ATTRIBUTE column 710, the input change list also contains a list of each output attribute that is affected by the input attribute in the AFFECTED NODE.OUTPUT_ATTRIBUTES column 720. For example, after walking the graph to determine the affected output attributes when the input attribute node_A.input_1 311 of dependency graph 300 changes, the system has stored the list of affected output attributes in the input change list 700 and associated them with node_A.input_1 311.

Referring to block 210, the next time the system detects a change in the input attribute node_A.input_1 311, the system may use input change list 700 to determine which output attributes will be affected without having to walk the graph. Specifically, the system can quickly determine that node_A.input_1 affects the output attributes 740. The dirty list may be updated to identify these affected output attributes as dirty in the dirty list.

Thus, when the system detects a change in the value of an input attribute, the system may access the input change list to determine whether information has already been compiled associating the changed input attribute with the output attributes it affects. If the input change list contains information specifying the relationship, there is no need to walk the graph to determine which output attributes are affected. Instead, the system may use the information stored in the input change list to update the dirty list.

It is desirable to reduce the number of times the system walks a graph because walking a graph is computationally resource intensive and time consuming. For example, multiple pointers of multiple nodes may need to be dereferenced each time the graph is walked, and these pointers may point to memory locations distributed at different locations in memory, in different physical memory chips or drives, or even in memory located across different computing systems. Accordingly, the system may save computational resources by reducing the number of times the graph is walked. This is especially true when the same attribute is repeatedly changed for multiple frames, multiple times, multiple intervals, multiple evaluations, or multiple other markers.

An input change list may be populated in several ways. As described above, the system may be configured to add an association to the input change list when the system detects a change in the value of an input attribute and the system determines that the input change list does not contain association information for the changed input attribute. In another example, the user may provide the associations that are stored in the list. In another example, the system may be configured to populate one or more associations before any evaluations take place, before any evaluation requests are received, or before the system detects any changes in the value of any input attributes. An input change list may also be generated or updated when the structure or dependencies of the dependency graph changes. For example, the input change list may be updated to reflect new dependencies if a new node is added to the dependency graph.

As an alternative to generating and updating the input change list as changes to input attributes are detected, the system may generate a complete or partial list of each attribute of a dependency graph, such as each input attribute, and the output attributes that it affects prior to the system requiring the information. If this is done, the system may not need to walk the graph the first time an attribute is changed.

Figure 8:
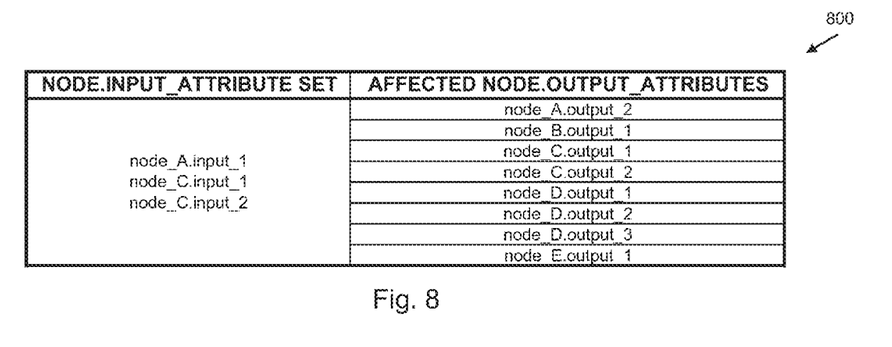
FIG. 8 illustrates an exemplary input change list for a set of input attributes.

FIG. 8 illustrates an example of an input change list that associates a set of input attributes with the output attributes they affect. For example, input change list 800 illustrates an association between input attributes node_A.input_1, node_C.input_1, and node_C.input_2 and output attributes node_A.output_2, node_B.output_1, node_C.output_1, node_C.output_2, node_D.output_1, node_D.output_2, node_D.output_3, and node_E.output_1. Storing this type of information may be helpful when a set of input attributes typically changes together, rather than independently.

In another example, the system may maintain a separate list for each of a plurality of input attributes that associate the input attributes with the attributes they affect. The list may be a comprehensive list of all attributes, a comprehensive list of all output attributes, a partial list of attributes, or a partial list of output attributes. For example, the input change list may be an array of "0"s and "1"s. A "1" at a particular location in the array may represent that an output attribute associated with that particular location is affected by the input attribute associated with the array and a "0" at a particular location in the array may represent that an output attribute associated with that particular location is not affected. Such an array may be more conducive to bitwise operations, such as AND, OR, NOT, and XOR, than other types of lists.

In order to preserve memory and other computational resources, restrictions may be placed on the input change list. One restriction may limit storage of association information between an input attribute and the output attributes it affects to n-number of input attributes. In one example, the last n-number of association information may be maintained, using a first-in-first-out system. Thus, the least-recently accessed, least-recently updated, or the oldest-added associations may be removed when a new association is added. In another example, the system may only store association information after a determined or calculated number of changes to the value of an attribute. This may prevent less-frequently-changed attributes from pushing out more-frequently-changed attributes from the input dependency list.

3. Updating the Dirty List Based on the Input Change List

Referring to block 212 of FIG. 2, once the system has determined the output attributes that are affected by the changed input attribute, the system may update the dirty list to mark the affected output attributes as dirty. The dirty list may be updated based on the association information in the input change list.

In one example, the system may perform a bitwise OR operation on the contents of the dirty list and the list of output attributes affected by the changed input. The dirty list may be updated to mark any output attribute dirty if it is either marked as dirty in the dirty list or marked as affected by the changed input attribute in the input change list.

4. Receiving an Evaluation Request for an Output Attribute

In block 214, the system may receive a request to evaluate an output attribute. When a request is received to evaluate a dependency graph, or part of a dependency graph, the system may save time and computing resources by only reevaluating those output attributes that have both been marked as dirty and that affect the evaluation. This may be referred to as a "lazy evaluation." In order to use lazy evaluation, the system may determine which output attributes affect the requested output attribute and which of the affecting output attributes are dirty. Any cached values of output attributes that affect the evaluation, but have not been marked as dirty, may be used without being reevaluated.

For example, the dirty output attributes of nodes that only relate to an object that is not visible in a part of a scene may not need to be evaluated for those portions of the scene because they do not affect the scene. Similarly, dirty output attributes may not need to be evaluated when a user has specified that the user is not interested in the effect the output attributes will have on an evaluation. Accordingly, every dirty output attribute of a dependency graph does not need to be evaluated at each time, frame, interval, evaluation, or other marker when lazy evaluation is used.

Using the input change list and the dirty list, the system may determine which output attributes are dirty. To determine which output attributes affect a requested output attribute, the system may be configured to access an output dependency list. The output dependency list may comprise an association between a requested output attribute and one or more output attributes that affect the requested output attribute. This output dependency list may be stored external to the dependency graph.

In block 216, if the system determines that association information for a requested output attribute is available in the output dependency list, the system may use the association information to quickly determine which output attributes may need to be reevaluated for the requested output, if they are dirty. However, if the system determines that association information for the requested output attribute is not available in the output dependency list, the system may need to walk the graph to determine which output attributes affect the requested output attribute.

In block 218, when the association information is not available for the requested output attribute, the system may walk the graph upstream (e.g., follow the graph in the direction opposite that of the flow of information) starting at the requested output attribute to determine which output attributes affect the requested output attribute. The system may generate or update the output dependency list by storing association information gathered while walking the graph upstream from the requested output attribute. By storing this association information, the system may not need to walk the graph for subsequent evaluations to determine which output attributes affect a requested output attribute. Further, the output dependency list may store multiple requested output attributes, each requested output attributed associated with all or some of the output attributes that respectively affect it.

The dependency graph 300 of FIG. 3 and the illustrative output dependency list 900 of FIG. 9 illustrate this concept. The NODE.OUTPUT_ATTRIBUTE column 910 of output dependency list 900 contains an output attribute 930. The output dependency list 900 associates the output attribute 930 and a list of each output attribute 940 that affects it. The AFFECTING NODE.OUTPUT_ATTRIBUTES column 920 contains the list of affecting output attributes 940.

Consider the example when a user or the system requests the value of output attribute node_D.output_1 342. The system may first look to the output dependency list 900 to determine if it includes an association between the requested output attribute and the output attributes that affect it. In this case, output dependency list 900 does not contain an association between node_D.output_1 342 and the output attributes that affect it. Instead, output dependency list 900 contains an association between node_D.output_2 and the outputs that affect it. Thus, the system may walk the graph upstream on the dependency graph 300 to determine which output attributes affect the requested output attribute node_D.output_1 342. For example, the system may determine that node_B.output_1 322 affects node_D.output_1 342. However, node_B.output_1 322 is affected by node_A.output_1 312 and node_A.output_2 314. Thus, the system determines that output attributes node_B.output_1 322, node_A.output_1 312, and node_A.output_2 314 affect node_D.output_1 342. The system may update output dependency list 900 to store information associating the requested output attribute node_D.output_1 342 with the output attributes that affect it.

FIG. 10 illustrates an updated output dependency list 1000 that includes this association information. The next time a user or the system requests an evaluation of output attribute node_D.output_1 342, the system will not need to walk the graph to determine which output attributes affect it. Instead, the information will be available in the output dependency list 1000. Specifically, the system can look to the NODE.OUTPUT_ATTRIBUTE column 1010 and the AFFECTING NODE.OUTPUT_ATTRIBUTES column 1020 to determine that node_D.output_1 is affected by node_A.output_1, node_A.output_2, and node_B.output_1.

In block 220 of FIG. 2, when the association information is available for the requested output attribute, the system may not need to walk the graph. Instead, the system can quickly determine which output attributes affect the requested output attribute based on the output dependency list.

In one example, the output dependency list may comprise multiple associations where an output attribute is associated with the output attributes that affect it. In another example, the output dependency list may comprise multiple associations where an output attribute is associated with all, or some, outputs of the dependency graph and each associated output attribute is flagged as "affecting" or "not affecting." This may be done by marking an "affecting" flag as "1" for output attributes that affect the requested output attribute or "0" for output attributes that do not affect the requested output attribute.

In order to preserve memory and other computational resources, restrictions may be placed on the output dependency list. One restriction may limit storage of association information between a desired or requested output attribute and the output attributes affecting the desired output to n-number of desired or requested output attributes. In one example, the last n-number of association information data may be maintained, using a first-in-first-out system. Thus, the least-recently-accessed, least-recently-updated, or the oldest-added associations may be removed when a new association is added. In another example, the system may only store association information after a determined or calculated number of requests for a specific output attribute. This prevents less frequently requested output attributes from pushing out more frequently requested output attributes from the output dependency list.

In one example, the system may maintain a separate list for each of a plurality of output attributes that associate the output attributes with the attributes they affect. The list may be a comprehensive list of all attributes, a comprehensive list of all output attributes, a partial list of attributes, or a partial list of output attributes. For example, the output dependency list may be an array of "0"s and "1"s. A "0" at a particular location in the array may represent that an attribute associated with that particular location affects the requested attribute and a "1" at a particular location in the array may represent that an attribute associated with that particular location does not affect the requested attribute. Such an array may be more conducive to bitwise operations, such as AND, OR, NOT, XOR, than other types of lists.

5. Evaluating the Requested Output Attribute

In block 222, the system may evaluate the requested output attribute. Once the system determines which output attributes affect the requested output attribute and which output attributes of the dependency graph are dirty, the system may determine which output attributes should be evaluated based on lazy evaluation.

In one example, the list of output attributes to be evaluated for a requested output attribute may be determined by a bitwise AND operation on the dirty list and the output attributes affecting the requested output attributed, as stored in the output dependency list. After evaluating an output attribute, the system may update the status of the output attribute in the dirty list to indicate that the output attribute is no longer dirty. This status may be changed before, during, or after the output attribute (or the node associated with the output attribute) has been evaluated.

Thus, when a changed input attribute is contained in the input change list, the system can update the dirty list with the affected output attributes without walking the graph. Then, when a requested output attribute is already in the output dependency list, the system can determine which outputs affect the requested output attribute without walking the graph. The dirty list and the output dependency list for the requested output attribute may now be compared to determine which output attributes are dirty and affect the requested output attribute. Thus, evaluation of these dirty output attributes can begin without walking the graph. As a result, the requested output attribute may be properly evaluated. The dirty list may also be updated to reflect that the evaluated output attributes are no longer dirty.

In certain examples, blocks 204 through 212 may occur independently from blocks 214 to 222.

6. Animation System

Figure 11:
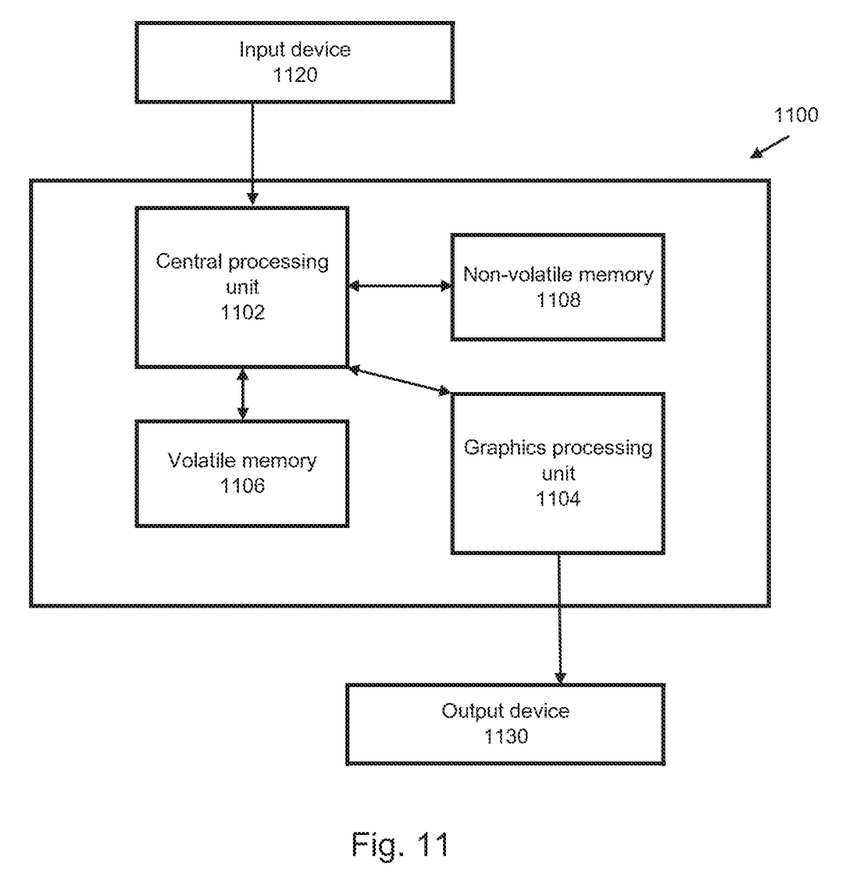
FIG. 11 illustrates an exemplary animation system.

FIG. 11 illustrates an exemplary animation system 1100 that may be used to implement the dependency graph evaluation process discussed above. The process may be implemented, for example, in either hardware or in software stored on a non-transitory computer-readable storage medium. The system may be configured to evaluate a dependency graph, a node within a dependency graph, or an output attribute of a dependency graph. The system may be further configured to receive input from a user and to display graphics, an image, or scene of an animation based on the evaluation.

The animation system 1100 may be configured to receive user input from an input device 1120. The input device 1120 may be any device that receives input from the user and transmits it to the animation system 1100. For example, the input device may be a keyboard, a mouse, a tablet, a stylus, or the like. Those skilled in the art will recognize that other types of input devices may also be used.

The animation system 1100 may be configured to output graphics, images, or animation to a display device 1130. The display device 1130 may be any device that receives data from the animation system and presents it to the user. For example, the display device may be a liquid crystal display, a set of light emitting diodes, a projector, or the like. Those skilled in the art will recognize that other types of output devices may also be used.

The animation system 1100 may comprise a central processing unit 1102. The central processing unit may comprise one or more processing cores. The central processing unit 1102 may be coupled to and able to communicate with the input device 1120. Although the animation system 1100 is illustrated with one central processing unit 1102, the animation system 1100 may have multiple processing units. The animation system 1100 may also comprise a graphics processing unit 1104. The graphics processing unit 1104 may be dedicated to processing graphics related data. The graphics processing unit 1104 may comprise a single processing core or multiple processing cores. Although the animation system 1100 is illustrated with one graphics processing unit 1104, the animation system 1100 may have a plurality of graphics processing units. The central processing unit 1102 and/or the graphics processing unit 1104 may be coupled to and able to communicate data to the output device 1130.

In one example, the animation system 1100 may comprise one or more processors and instructions stored in a non-transitory computer readable storage medium, such as a memory or storage device, that when executed by the one or more processors, perform the processes for evaluating an output attribute of a dependency graph as described above. In the context of the embodiments described herein, a "non-transitory computer readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The animation system 1100 may comprise volatile memory 1106, which is a non-transitory computer readable storage medium, in communication with the central processing unit 1102. The volatile memory 1106 may be, for example, random access memory, such as dynamic random access memory or static random access memory, or any other type of volatile memory. The volatile memory 1106 may be used to store data or instructions during the operation of the animation system 1100. Those skilled in the art will recognize that other types of volatile memory may also be used.

The animation system 1100 may also comprise non-volatile memory 1108, which is a non-transitory computer readable storage medium, in communication with the central processing unit 1102. The non-volatile memory 1108 may include flash memory, hard disks, magnetic storage devices, read-only memory, or the like. The non-volatile memory 1108 may be used to store animation data, dependency graph data, computer instructions, or any other information. Those skilled in the art will recognize that other types of non-volatile memory may also be used.

The animation system 1100 is not limited to the devices, configurations, and functionalities described above. For example, although a single volatile memory 1106, non-volatile memory 1108, central processing unit 1102, graphics processing unit 1104, input device 1120, and output device 1130 are illustrated, a plurality of any of these devices may be implemented internal or external to the animation system 1100. In addition, the animation system 1100 may comprise a network access device for accessing information on a network, such as an internal network or the Internet. Those skilled in the art will recognize other configurations of the animation system 1100 may be used.

Various exemplary embodiments are described herein. Reference is made to these examples in a non-limiting sense. They are provided to illustrate more broadly applicable aspects of the disclosed technology. Various changes may be made and equivalents may be substituted without departing from the true spirit and scope of the various embodiments. In addition, many modifications may be made to adapt a particular situation, material, composition of matter, process, process act(s) or step(s) to the objective(s), spirit or scope of the various embodiments. Further, as will be appreciated by those with skill in the art, each of the individual variations described and illustrated herein has discrete components and features which may be readily separated from or combined with the features of any of the other several embodiments without departing from the scope or spirit of the various embodiments.

What is claimed is:

1. A method for performing graphics processing, the method comprising:
    accessing a dependency graph, the dependency graph comprising a plurality of interconnected nodes, each node having one or more output attributes, wherein the dependency graph receives one or more input attributes;
    accessing a first list, wherein the first list includes a separate dirty status for each dirty output attribute of the dependency graph;
    accessing a second list, wherein the second list associates at least one of the one or more input attributes with output attributes that are affected by the at least one of the one or more input attributes;
    accessing a third list, wherein:
        the third list identifies at least one output attribute of a first node of the output attributes and identifies output attributes that affect the at least one output attribute of the first node of the output attributes, the output attributes that affect the at least one output attribute including an output attribute of a second node that is different from the first node; and
        the third list associates the at least one output attribute of the first node of the output attributes with the output attributes that affect the at least one output attribute of the first node of the output attributes;
    receiving an evaluation request for a requested output attribute; and
    evaluating, using a processor, a set of output attributes, the set of output attributes selected for evaluation based on the set of output attributes being specified in the first list as dirty and the set of output attributes being specified in the third list as associated with the requested output attribute.

2. The method of claim 1, further comprising:
    walking the dependency graph to determine the association in the second list.

3. The method of claim 2, wherein walking the graph dependency to determine the association in the second list is in response to detecting a change in the value of the at least one of the one or more input attributes.

4. The method of claim 1, wherein the first list is updated based on the second list in response to detecting a change in the value of the at least one of the one or more input attributes.

5. The method of claim 1, further comprising:
    updating the third list to associate the requested output attribute with output attributes that affect the requested output attribute in response to receiving the evaluation request.

6. The method of claim 5, further comprising:
    walking the dependency graph to determine the association in the third list.

7. The method of claim 1, further comprising:
  updating the dirty status for the output attributes in the first list in response to the evaluation of the set of output attributes.

8. The method of claim 1, wherein the dependency graph represents one or more three-dimensional objects.

9. A non-transitory computer-readable storage medium comprising computer-executable instructions for performing graphics processing, the computer-executable instructions comprising instructions for:
  accessing a dependency graph, the dependency graph comprising a plurality of interconnected nodes, each node having one or more output attributes, wherein the dependency graph receives one or more input attributes;
  accessing a first list, wherein the first list includes a separate dirty status for each dirty output attribute of the dependency graph;
  accessing a second list, wherein the second list associates at least one of the one or more input attributes with output attributes that are affected by the at least one of the one or more input attributes;
  accessing a third list, wherein:
    the third list identifies at least one output attribute of a first node of the output attributes and identifies output attributes that affect the at least one output attribute of the first node of the output attributes, the output attributes that affect the at least one output attribute including an output attribute of a second node that is different from the first node; and
    the third list associates the at least one output attribute of the first node of the output attributes with the output attributes that affect the at least one output attribute of the first node of the output attributes;
  receiving an evaluation request for a requested output attribute; and
  evaluating, using a processor, a set of output attributes, the set of output attributes selected for evaluation based on the set of output attributes being specified in the first list as dirty and the set of output attributes being specified in the third list as associated with the requested output attribute.

10. The computer-readable storage medium of claim 9, further comprising instructions for:
  walking the dependency graph to determine the association in the second list.

11. The computer-readable storage medium of claim 10, wherein walking the graph dependency to determine the association in the second list is in response to detecting a change in the value of the at least one of the one or more input attributes.

12. The computer-readable storage medium of claim 9, wherein the first list is updated based on the second list in response to detecting a change in the value of the at least one of the one or more input attributes.

13. The computer-readable storage medium of claim 9, further comprising instructions for:
  updating the third list to associate the requested output attribute with output attributes that affect the requested output attribute in response to receiving the evaluation request.

14. The computer-readable storage medium of claim 13, further comprising instructions for:
  walking the dependency graph to determine the association in the third list.

15. The computer-readable storage medium of claim 9, further comprising instructions for:
  updating the dirty status for the output attributes in the first list in response to the evaluation of the set of output attributes.

16. The computer-readable storage medium of claim 9, wherein the dependency graph represents one or more three-dimensional objects.

17. An apparatus for performing graphics processing, the apparatus comprising:
  a memory configured to store data; and
  a computer processor configured to:
    access a dependency graph, the dependency graph comprising a plurality of interconnected nodes, each node having one or more output attributes, wherein the dependency graph receives one or more input attributes;
    access a first list, wherein the first list includes a separate dirty status for each dirty output attribute of the dependency graph;
    access a second list, wherein the second list associates at least one of the one or more input attributes with output attributes that are affected by the at least one of the one or more input attributes;
    access a third list, wherein:
      the third list identifies at least one output attribute of a first node of the output attributes and identifies output attributes that affect the at least one output attribute of the first node of the output attributes, the output attributes that affect the at least one output attribute including an output attribute of a second node that is different from the first node; and
      the third list associates the at least one output attribute of the first node of the output attributes with the output attributes that affect the at least one output attribute of the first node of the output attributes;
    receive an evaluation request for a requested output attribute; and
    evaluate a set of output attributes, the set of output attributes selected for evaluation based on the set of output attributes being specified in the first list as dirty and the set of output attributes being specified in the third list as associated with the requested output attribute.

18. The apparatus of claim 17, wherein the computer processor is further configured to:
  walk the dependency graph to determine the association in the second list.

19. The apparatus of claim 18, wherein walking the graph dependency to determine the association in the second list is in response to detecting a change in the value of the at least one of the one or more input attributes.

20. The apparatus of claim 17, wherein the first list is updated based on the second list in response to detecting a change in the value of the at least one of the one or more input attributes.

21. The apparatus of claim 17, wherein the computer processor is further configured to:
  update the third list to associate the requested output attribute with output attributes that affect the requested output attribute in response to receiving the evaluation request.

22. The apparatus of claim 21, wherein the computer processor is further configured to:
  walking the dependency graph to determine the association in the third list.

23. The apparatus of claim 17, wherein the computer processor is further configured to:
    update the dirty status for the output attributes in the first list in response to the evaluation of the set of output attributes.

24. The apparatus of claim 17, wherein the dependency graph represents one or more three-dimensional objects.

* * * * *